US012664123B2

(12) United States Patent
Krishna et al.

(10) Patent No.: US 12,664,123 B2
(45) Date of Patent: Jun. 23, 2026

(54) CROSS-PLATFORM APPLICATION CONTAINERIZED EXECUTION

(71) Applicant: MICRO FOCUS LLC, Santa Clara, CA (US)

(72) Inventors: Vamsi Krishna, Bangalore (IN); Ashoka Shetty, Bangalore (IN); Harinath Jarugula, Bangalore (IN); Balakumar Subramani, Bangalore (IN); Srijith Kochunni, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 441 days.

(21) Appl. No.: 17/512,272

(22) Filed: Oct. 27, 2021

(65) Prior Publication Data

US 2023/0125342 A1    Apr. 27, 2023

(51) Int. Cl.
*G06F 16/11* (2019.01)
*G06F 16/16* (2019.01)
(Continued)

(52) U.S. Cl.
CPC ............ *G06F 16/128* (2019.01); *G06F 16/16* (2019.01); *G06F 16/182* (2019.01); *G06F 16/192* (2019.01)

(58) Field of Classification Search
CPC ...... G06F 16/16; G06F 16/128; G06F 16/182; G06F 16/192
See application file for complete search history.

(56) References Cited

U.S. PATENT DOCUMENTS 10,430,378 B1 * 10/2019 Harter ..................... G06F 16/16
11,126,740 B2 * 9/2021 Havewala ............. G06F 16/182
(Continued)

FOREIGN PATENT DOCUMENTS

CN     109408069 A     3/2019
CN     111343219 A     6/2020
CN     112560244 A     3/2021

OTHER PUBLICATIONS

Wang, "Method and apparatus for running second system application in first system, device, and medium," priority date Jul. 21, 2020, published Jan. 27, 2022, WO 2022/017242, pp. 1-33.*

(Continued)

*Primary Examiner* — Kavita Stanley
*Assistant Examiner* — Jedidiah P Ferrer
(74) *Attorney, Agent, or Firm* — Sheridan Ross P.C.

(57) ABSTRACT

A manifest file from a container image for a cross-platform application that has been containerized for execution on a source platform specifies image layers for the cross-platform application within the container image and are ordered from a first image layer through a last image layer. The manifest file specifies exclusion/inclusion directories related to containerized execution of the cross-platform application on a target platform different than the source platform. Starting with the first image layer and ending at the last image layer, each image layer is unpacked at the target platform by copying files from the image layer to a directory at the target platform in accordance with the identified exclusion/inclusion directories. A version of the cross-platform application corresponding to the image layers as unpacked at the target platform is executed in a containerized manner.

20 Claims, 13 Drawing Sheets

(51) Int. Cl.
G06F 16/182 (2019.01)
G06F 16/188 (2019.01)

(56) References Cited

U.S. PATENT DOCUMENTS

| 2005/0034121 A1* | 2/2005 | Fisher | G06F 8/61 |
| | | | 717/169 |
| 2009/0265703 A1* | 10/2009 | Bess | G06F 9/4856 |
| | | | 717/174 |
| 2015/0039876 A1* | 2/2015 | Baratam | G06F 9/4401 |
| | | | 713/2 |
| 2019/0147047 A1* | 5/2019 | Chen | G06F 16/188 |
| | | | 707/692 |
| 2019/0369979 A1* | 12/2019 | Woods | G06F 16/137 |
| 2021/0382997 A1* | 12/2021 | Yi | G06F 21/577 |
| 2023/0004483 A1* | 1/2023 | Melski | G06F 11/3684 |
| 2023/0297348 A1* | 9/2023 | Wang | G06F 8/61 |
| | | | 717/140 |

OTHER PUBLICATIONS

English translation of WO 2022017242 (Year: 2022), pp. 1-12.*
Rivera, A. "Building Docker Images for Multiple Operating System Architectures", circleci blog Oct. 26, 2020, 13pp.
Larsson, M. "Create Multi-Platform Docker Images", Callista Blogg, Dec. 28, 2017, 15pp.
Duncan, J. "Easily Making Container Images for Multiple Platforms", https://medium.com/@jamieeduncan/easily-making-container-images-for-multiple-platforms-6fbf097c, Jul. 4, 2020.
Patterson, R., "Mixing Windows and Linux Container with Docker Compose", Mar. 21, 2019.
"Support policy for Windows Server containers in on-premises scenarios", Microsoft, Sep. 24, 2021.

* cited by examiner

Figure 3A:
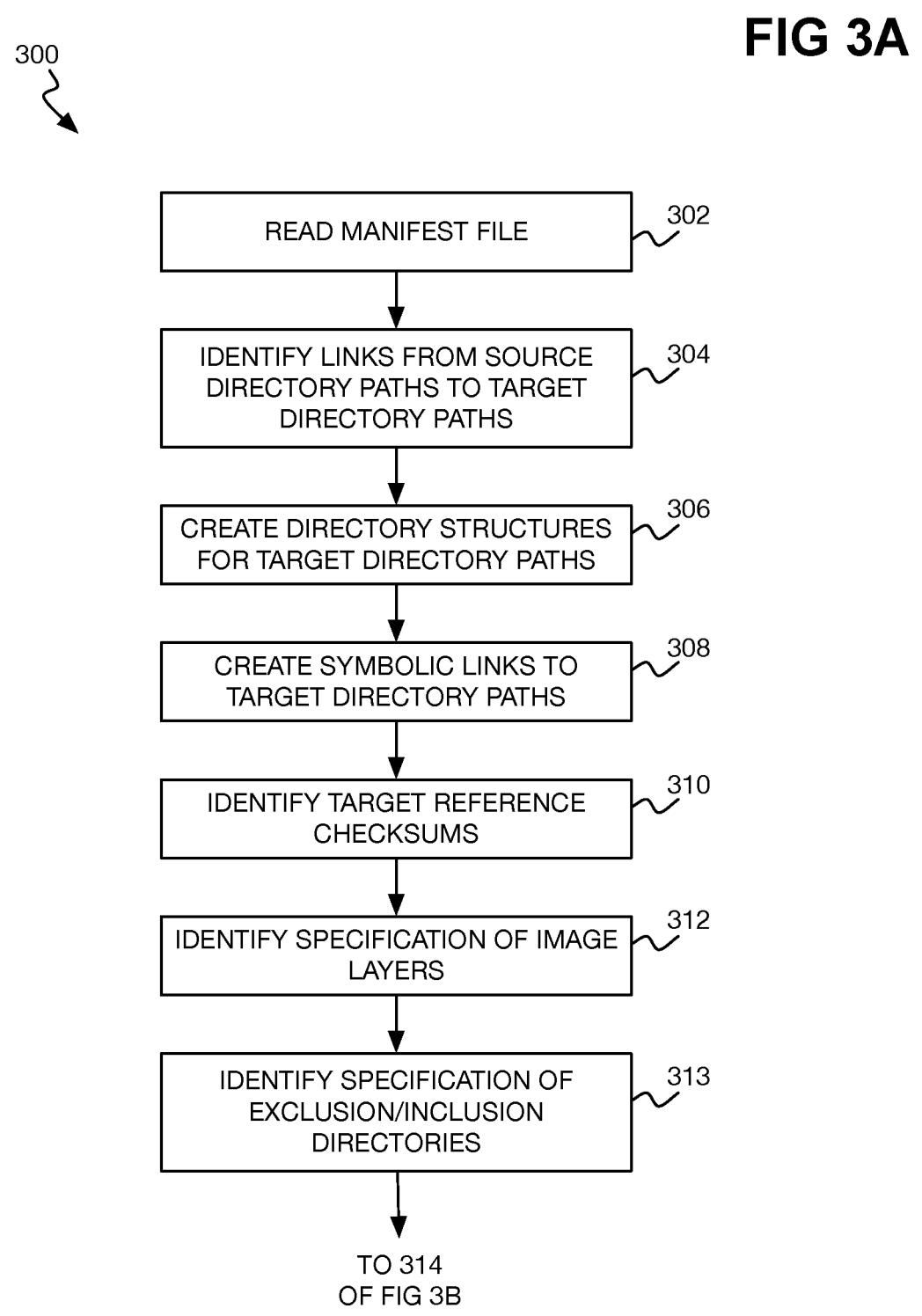

READ MANIFEST FILE — 302

IDENTIFY LINKS FROM SOURCE DIRECTORY PATHS TO TARGET DIRECTORY PATHS — 304

CREATE DIRECTORY STRUCTURES FOR TARGET DIRECTORY PATHS — 306

CREATE SYMBOLIC LINKS TO TARGET DIRECTORY PATHS — 308

IDENTIFY TARGET REFERENCE CHECKSUMS — 310

IDENTIFY SPECIFICATION OF IMAGE LAYERS — 312

IDENTIFY SPECIFICATION OF EXCLUSION/INCLUSION DIRECTORIES — 313

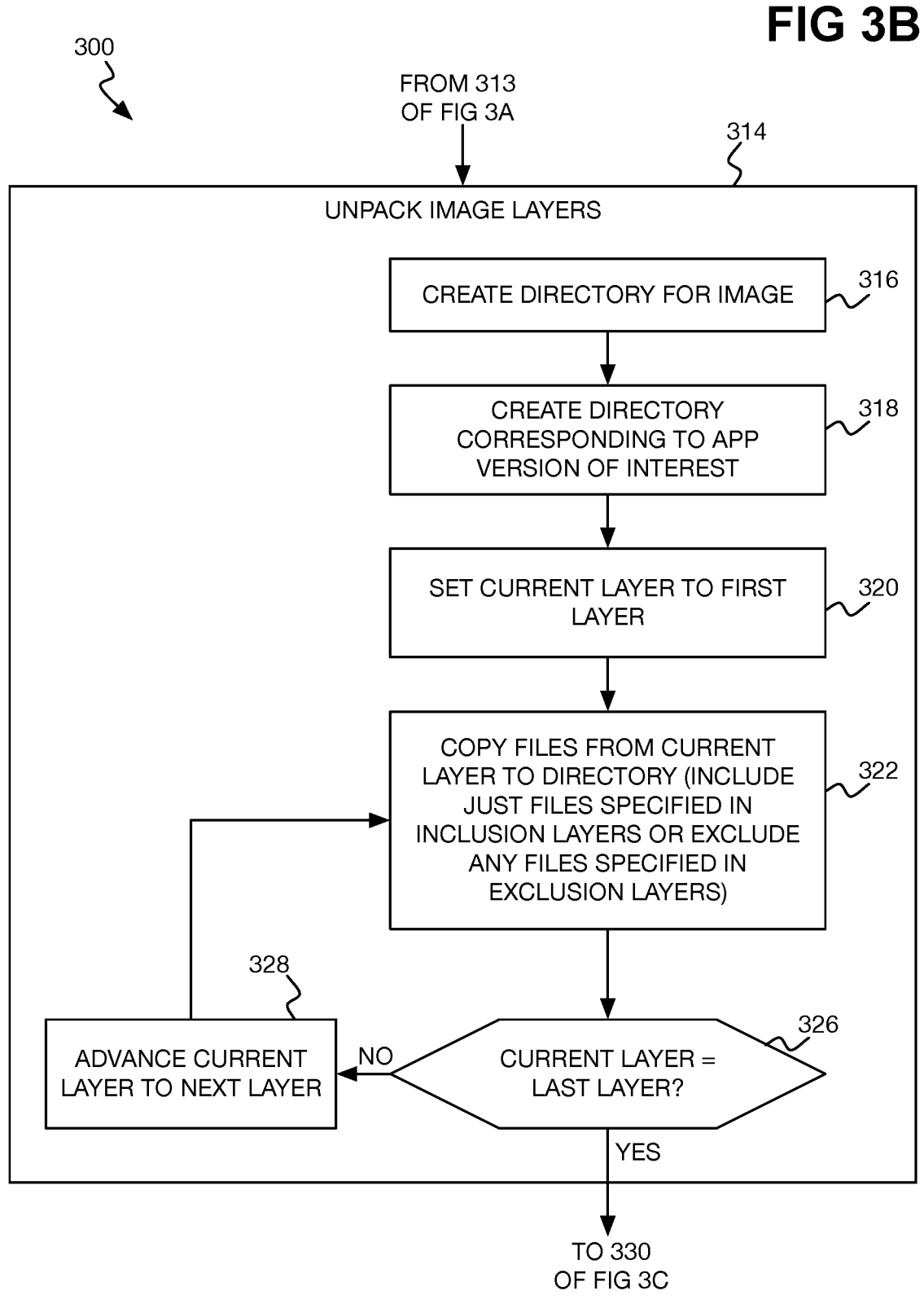

FROM 313
OF FIG 3A

314

UNPACK IMAGE LAYERS

CREATE DIRECTORY FOR IMAGE 316

CREATE DIRECTORY CORRESPONDING TO APP VERSION OF INTEREST 318

SET CURRENT LAYER TO FIRST LAYER 320

COPY FILES FROM CURRENT LAYER TO DIRECTORY (INCLUDE JUST FILES SPECIFIED IN INCLUSION LAYERS OR EXCLUDE ANY FILES SPECIFIED IN EXCLUSION LAYERS) 322

328

ADVANCE CURRENT LAYER TO NEXT LAYER

NO

CURRENT LAYER = LAST LAYER? 326

YES

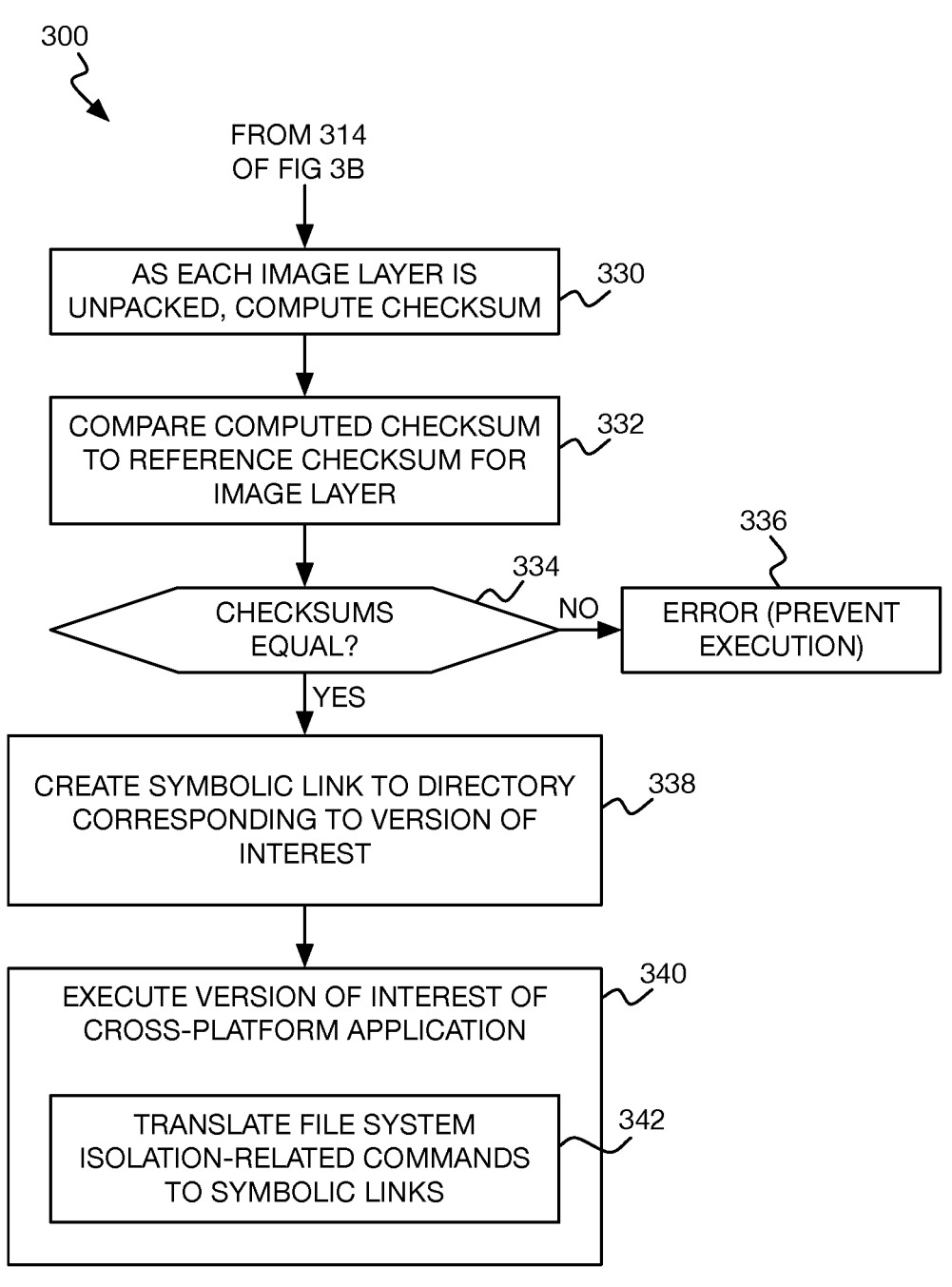

300

FROM 314
OF FIG 3B

AS EACH IMAGE LAYER IS
UNPACKED, COMPUTE CHECKSUM          330

COMPARE COMPUTED CHECKSUM
TO REFERENCE CHECKSUM FOR
IMAGE LAYER          332

CHECKSUMS
EQUAL?          334          NO          ERROR (PREVENT
EXECUTION)          336

YES

CREATE SYMBOLIC LINK TO DIRECTORY
CORRESPONDING TO VERSION OF
INTEREST          338

EXECUTE VERSION OF INTEREST OF
CROSS-PLATFORM APPLICATION          340

TRANSLATE FILE SYSTEM
ISOLATION-RELATED COMMANDS
TO SYMBOLIC LINKS          342

FIG 4C

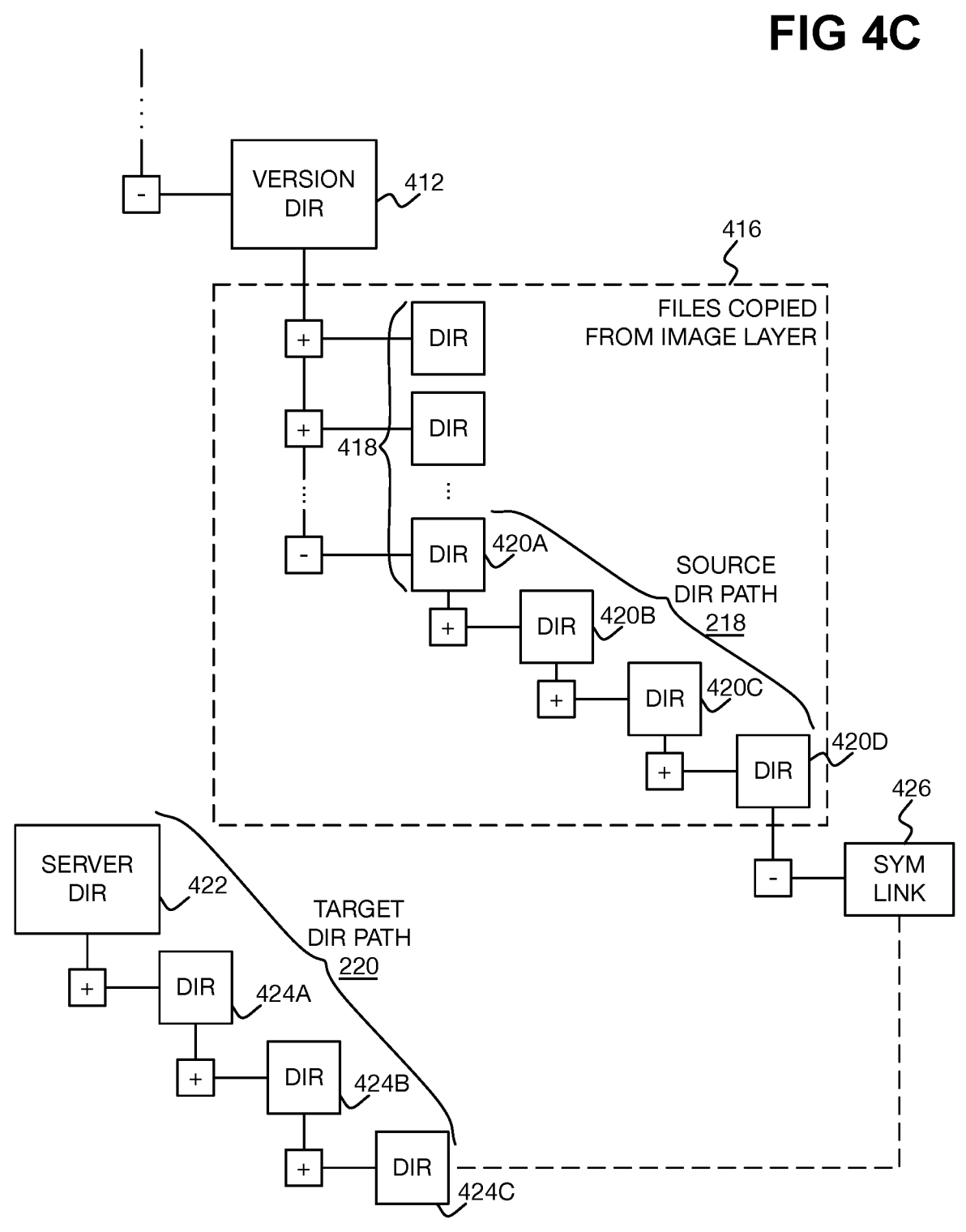

VERSION DIR — 412

416

FILES COPIED FROM IMAGE LAYER

DIR

DIR

418

DIR — 420A

SOURCE DIR PATH 218

DIR — 420B

DIR — 420C

DIR — 420D

SYM LINK — 426

SERVER DIR — 422

TARGET DIR PATH 220

DIR — 424A

DIR — 424B

DIR — 424C

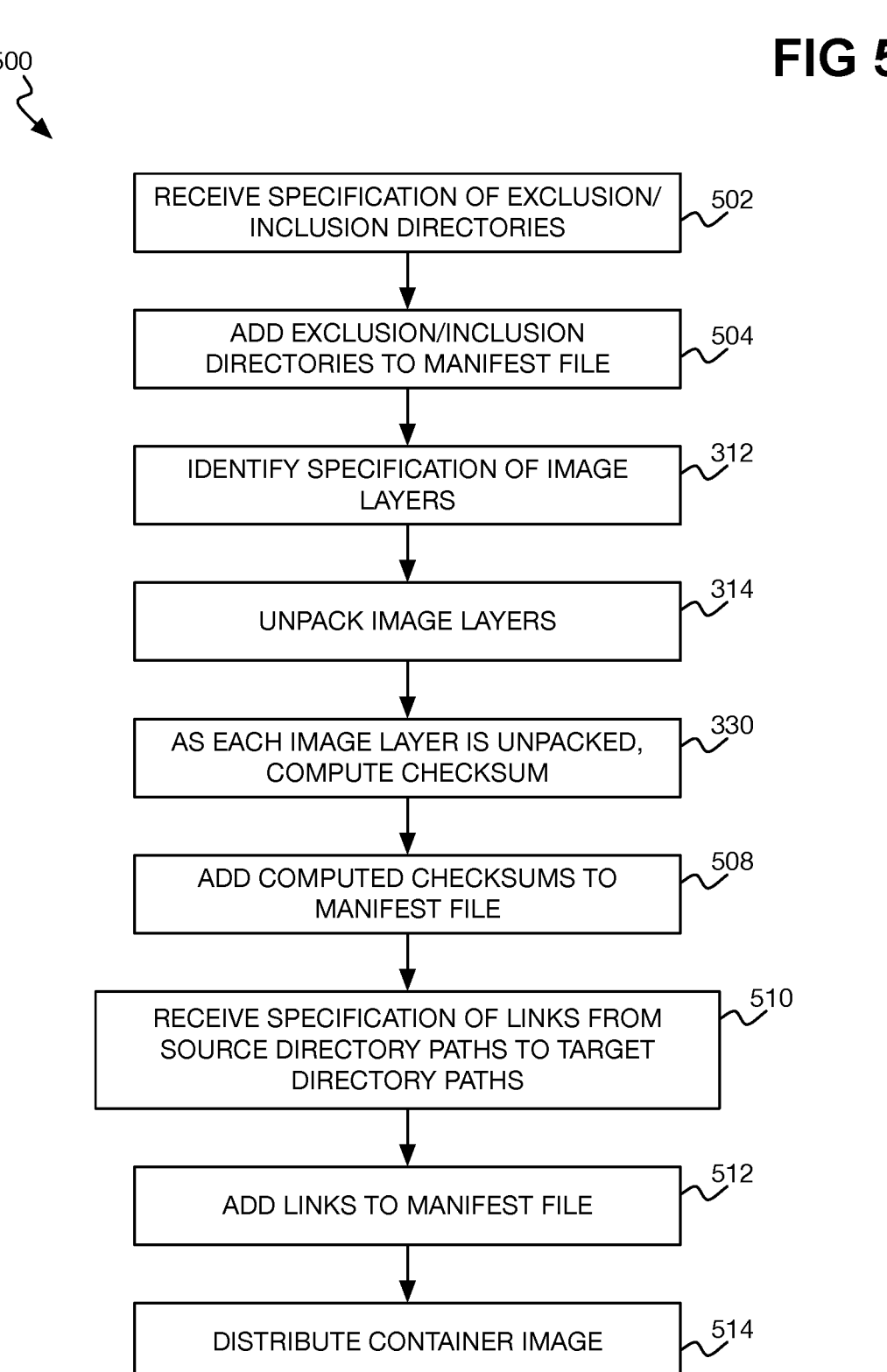

| | |
|---|---|
| RECEIVE SPECIFICATION OF EXCLUSION/ INCLUSION DIRECTORIES | 502 |
| ADD EXCLUSION/INCLUSION DIRECTORIES TO MANIFEST FILE | 504 |
| IDENTIFY SPECIFICATION OF IMAGE LAYERS | 312 |
| UNPACK IMAGE LAYERS | 314 |
| AS EACH IMAGE LAYER IS UNPACKED, COMPUTE CHECKSUM | 330 |
| ADD COMPUTED CHECKSUMS TO MANIFEST FILE | 508 |
| RECEIVE SPECIFICATION OF LINKS FROM SOURCE DIRECTORY PATHS TO TARGET DIRECTORY PATHS | 510 |
| ADD LINKS TO MANIFEST FILE | 512 |
| DISTRIBUTE CONTAINER IMAGE | 514 |

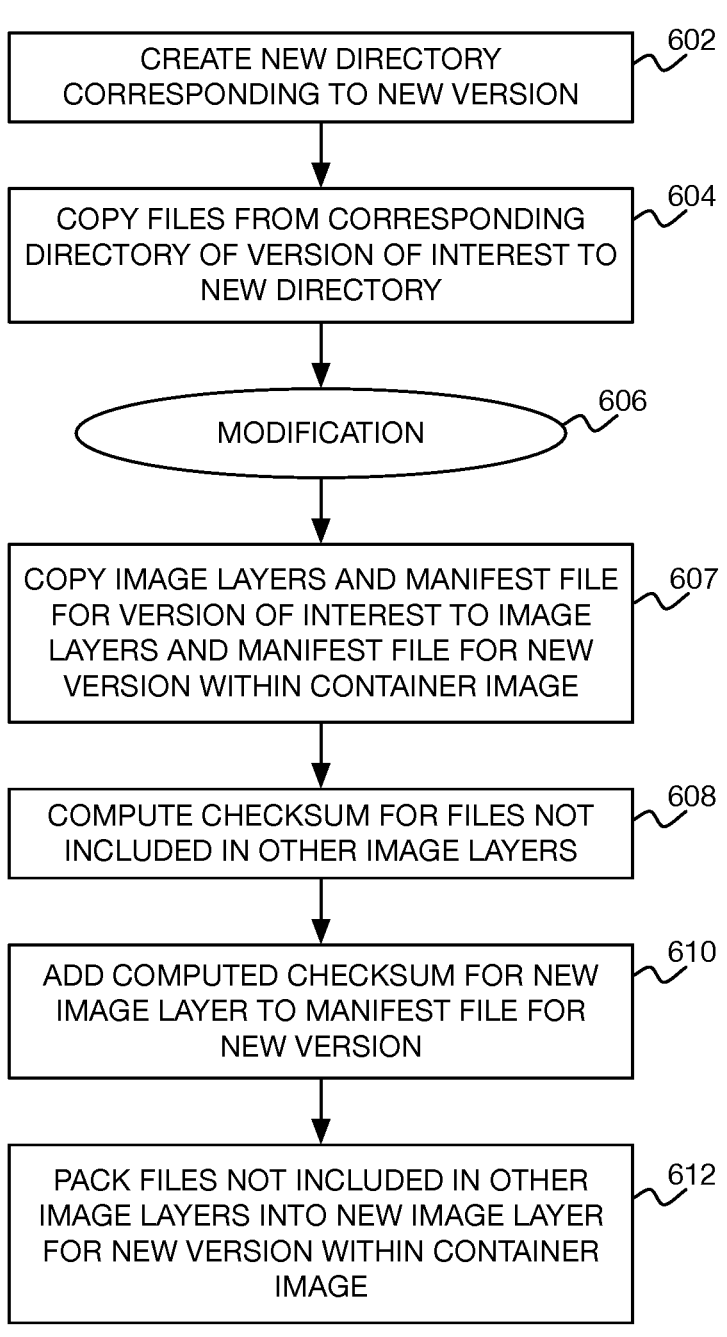

CREATE NEW VERSION OF CROSS-PLATFORM APPLICATION

| CREATE NEW DIRECTORY CORRESPONDING TO NEW VERSION | 602 |

| COPY FILES FROM CORRESPONDING DIRECTORY OF VERSION OF INTEREST TO NEW DIRECTORY | 604 |

MODIFICATION   606

| COPY IMAGE LAYERS AND MANIFEST FILE FOR VERSION OF INTEREST TO IMAGE LAYERS AND MANIFEST FILE FOR NEW VERSION WITHIN CONTAINER IMAGE | 607 |

| COMPUTE CHECKSUM FOR FILES NOT INCLUDED IN OTHER IMAGE LAYERS | 608 |

| ADD COMPUTED CHECKSUM FOR NEW IMAGE LAYER TO MANIFEST FILE FOR NEW VERSION | 610 |

| PACK FILES NOT INCLUDED IN OTHER IMAGE LAYERS INTO NEW IMAGE LAYER FOR NEW VERSION WITHIN CONTAINER IMAGE | 612 |

CROSS-PLATFORM APPLICATION CONTAINERIZED EXECUTION

BACKGROUND

Application containerization is an operating system (OS)-level virtualization technique to deploy and execute applications, without having to run an entire virtual machine (VM) for each application. A container is a unit of software that packages program code for an application and any dependencies so that the application can be easily distributed to new computing environments for execution. A container image is a standalone package of software that includes everything needed to run an application: program code, runtime and system tools, system libraries, and settings. A container image becomes a container at runtime.

A container isolates an application from its environment, and ensures that the application runs correctly in different computing environments despite differences in the computing environments. Specifically, a container runtime engine running on an underlying platform (e.g., an OS instance) unpacks a container image to execute an application within a container. Application containerization is a more efficient software virtualization technique than VMs. Rather than having multiple VMs running on the same underlying platform, each with its own application, application containerization permits multiple applications to run in corresponding containers on the same platform.

BRIEF DESCRIPTION OF THE DRAWINGS

FIGS. 3A, 3B, and 3C are flowcharts of an example method for containerized execution of the cross-platform application of the container image of FIGS. 2A and 2B.

FIGS. 4A, 4B, and 4C are diagrams illustratively depicting example performance of the methods of FIGS. 3A, 3B, and 3C.

FIG. 5 is a flowchart of an example method for modifying a container image to realize the container image of FIGS. 2A and 2B so that the cross-platform application can run in a container on a target platform different than the source platform on which the application was packed into the container image.

FIG. 6 is a flowchart of an example method for creating a new version of a cross-platform application of the container image of FIGS. 2A and 2B on a target platform different than the source platform on which the application was originally packed into the container image, including modifying the container image to include the new version of the application.

DETAILED DESCRIPTION

Figure 1:
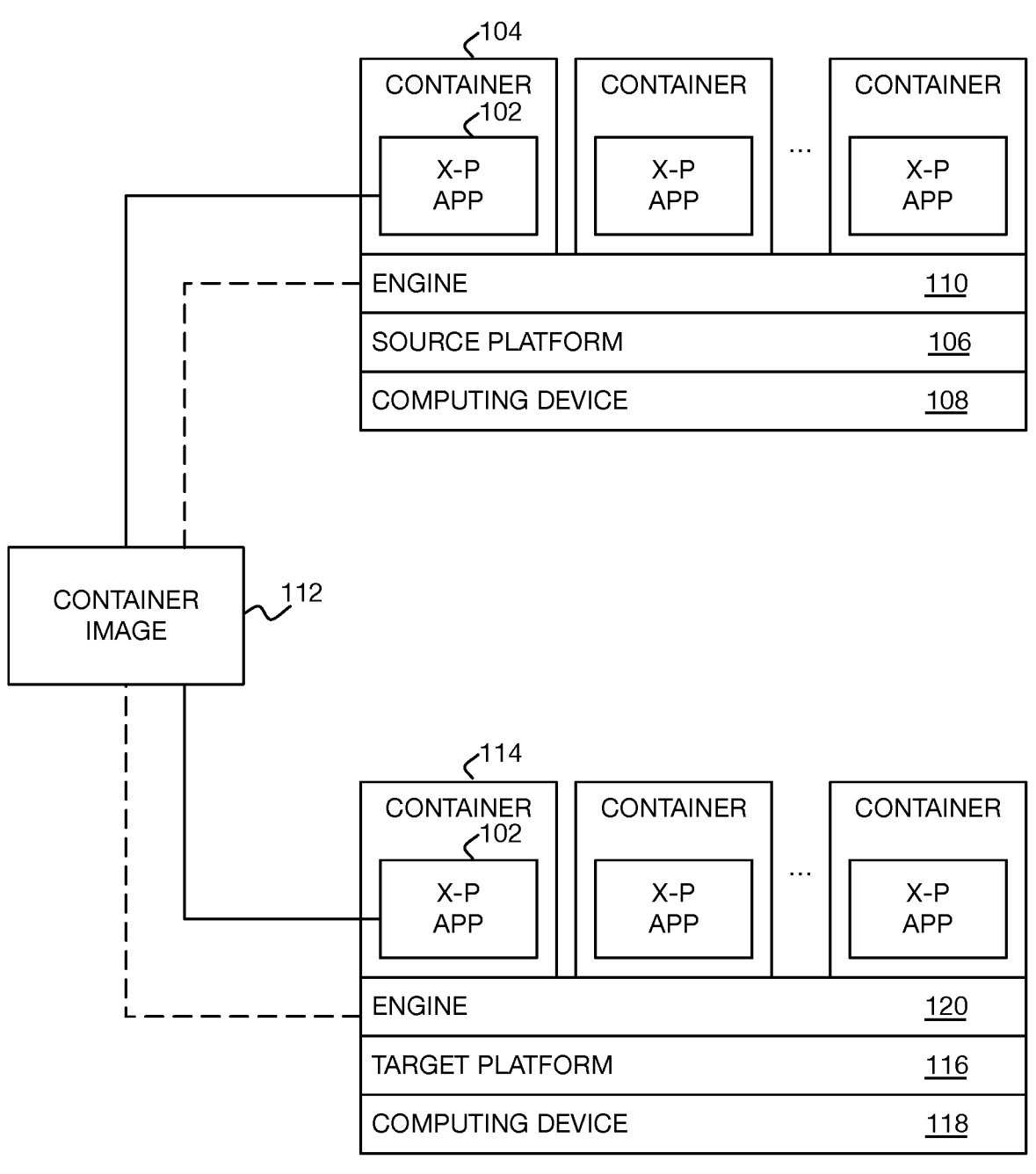
FIG. 1 is a diagram of an example container image for a cross-platform application that provides for containerized execution of the application on different platforms.

As noted in the background, application containerization is a software virtualization technique that is more efficient than other software virtualization techniques, such as those that employ virtual machines (VMs). That is, the operating system is not virtualized for each application that is to be run in a given computing environment. Rather, the applications are run within containers on the same underlying operating system, or platform, via a container runtime engine situated between the containers and the underlying platform. An example of containerization technology is DOCKER, which permits applications to run in DOCKER containers via a DOCKER runtime engine running on an underlying platform.

Applications can be platform-specific or platform-independent. A platform-specific application can run just on the platform for which it has been developed. For example, an application that relies on features of a specific operating system (OS), such as the libraries, application programming interfaces (APIs), and so on, of that OS, usually cannot run on a different OS. An application developed for the LINUX operating system, for instance, cannot run on the MICROSOFT WINDOWS operating system.

By comparison, a platform-independent application can run on different platforms. A platform-independent application is also referred to as a cross-platform application. For example, an application may be developed using the JAVA programming language, and can be run on any platform (i.e., any operating system) for which there is a JAVA interpreter or other engine that can translate the application to the underlying platform at runtime.

However, containerized execution of a cross-platform application on different platforms still requires a container runtime engine specific to each platform. For example, for a cross-platform application developed using the JAVA programming language to run in a container on a computing device running the LINUX operating system, there has to be a container runtime engine specific to this platform. Similarly, for the cross-platform application to run in a container on a computing device running the MICROSOFT WINDOWS operating system, there has to be a container runtime engine specific to this platform.

Container runtime engines can provide for various types of isolation of applications running in different containers. Such isolation includes filesystem isolation, meaning that the application of one container can in effect run on its own file system as compared to the application of another container, and the latter application cannot access the files of the former application. Such isolation can also include resource isolation, including memory, processor, and network isolation. Resource isolation ensures that the resources used by the application of one container are not accessible by the application of another container.

To provide for such isolation, container runtime engines may have to be deeply integrated with their underlying platforms. For instance, a runtime engine may have to access the kernel of the operating system on which the engine is running in ways that the manufacturer of the operating system does not usually permit. In the case of the MICROSOFT WINDOWS operating system, for example, a DOCKER runtime engine may have to link into the kernel of the operating system in ways that exceed the publicly available specification of the operating system. This limits the ability of a third party to provide a container runtime engine on the MICROSOFT WINDOWS operating system that provides for full containerized application execution isolation.

Furthermore, even if an application is a cross-platform application, containerized execution of the application on a given platform may rely on commands specific to that platform and unavailable on another platform. For example, to achieve filesystem isolation on the LINUX operating system, containers for cross-platform applications may rely on change root ("chroot") commands and mount point commands ("mount pointing") that are unavailable on the MICROSOFT WINDOWS operating system. This means that a containerized image for such an application created on one platform may not be able to be used for containerized execution of the application on another platform, even if the application itself is a cross-platform application.

Techniques described herein ameliorate these and other issues. The techniques provide for containerized execution of a cross-platform application on a target platform different than a source platform on which the application was originally packed into a container image. The techniques do not require deep integration within the kernel of the target operating system for the container runtime engine to execute the application in a container. While the techniques may thus not be able to provide for resource isolation, the techniques can still provide for filesystem isolation, even when the container for the cross-platform application relies on source platform-specific commands that are unavailable on the target platform.

FIG. 1 shows containerized execution of a cross-platform application 102 within a container 104 on a source platform 106 of a computing device 108. The cross-platform application 102 may have been developed on the source platform 106 using a platform-independent programming language, such as the JAVA programming language. The source platform 106 may be the LINUX operating system in one implementation. The computing device 108 may be a computer, such as a desktop, laptop, notebook, or server computer, or another type of computing device.

Containerized execution of the cross-platform application 102 is provided by a container runtime engine 110. The container runtime engine 110 runs on the source platform 106 (e.g., on the operating system), which itself runs on the computing device 108. The container runtime engine 110 may be provided by the developer of the containerization technology being employed. For example, the container runtime engine 110 may be the DOCKER runtime engine when DOCKER containerization technology is being used, in which case the cross-platform application 102 runs within a DOCKER container 104. Multiple cross-platform (as well as platform-specific) applications can run in corresponding containers via the engine 110, although just one such cross-platform application 102 and its associated container 104 are called out in the figure.

A container image 112 for the cross-platform application 102 may be created on the computing device 108 having or running the source platform 106. That is, the container runtime engine 110, or another component of the containerization technology solution being employed, may be used to create the container image 112 for the cross-platform application 102. Once the container image 112 has been created, the engine 110 can therefore instantiate the container 104 including the application 102 at runtime, to provide for containerized execution of the application 102 within the container 104 on the source platform 106. The container image 112 may thus be initially created in a manner that is specific to the source platform 106 for filesystem and resource isolation, even though the application 102 itself is platform-independent.

In FIG. 1, however, the container image 112 has been modified so that the cross-platform application 102 can also be run within a container 114 on a target platform 116 running on another computing device 118. The target platform 116 is different than the source platform 106. For example, the target platform 116 may be the MICROSOFT WINDOWS operating system. A container runtime engine 120 specific to the target platform 116 executes the cross-platform application 102 within the container 114 on the target platform 116.

Therefore, at runtime, the container runtime engine 120 instantiates the container 114 for the cross-platform application 102 from the container image 112 and accordingly executes the application 102. The container runtime engine 120 provides for filesystem isolation of the application 102 within the container 114 in relation to other cross-platform (as well as platform-specific) applications running via the engine 120 on the target platform 116, which are shown but not specifically called out in the figure. The engine 120 does not require deep kernel integration into the target platform 116, and thus may not provide for resource isolation like the container runtime engine 110 running on the source platform 106 does.

The remainder of the detailed description provides specifics as to the container image 112 and the container runtime engine 120 on the target platform 116. That is, what the container image 112 originally created for instantiation of a container 104 on the source platform 106 also includes for instantiation of a container 114 on the target platform 116 for containerized execution of the application 102 on the target platform 116 is described. How the container runtime engine 120 processes such a modified container image 112 for instantiation of a container 114 on the target platform 116—and thus how the engine 120 is implemented from a functional perspective—is described. How the container image 112 is modified so that the container 114 on the target platform 116 is described, as is how the container image 112 can be modified to include a new version of the cross-platform application 102 created on the target platform 116.

Figure 2A:
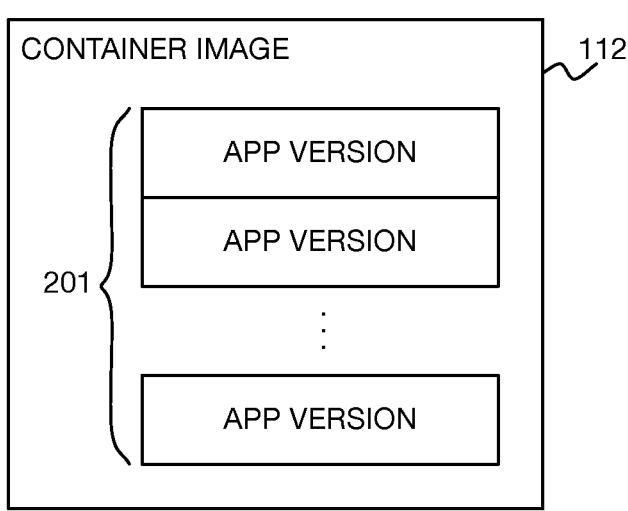
FIGS. 2A and 2B are diagrams of the example container image of FIG. 1 in detail, specifically the parts thereof that permit the cross-platform application to be executed within a container on a target platform different than the source platform on which the application was packed into the container image.
Figure 2B:
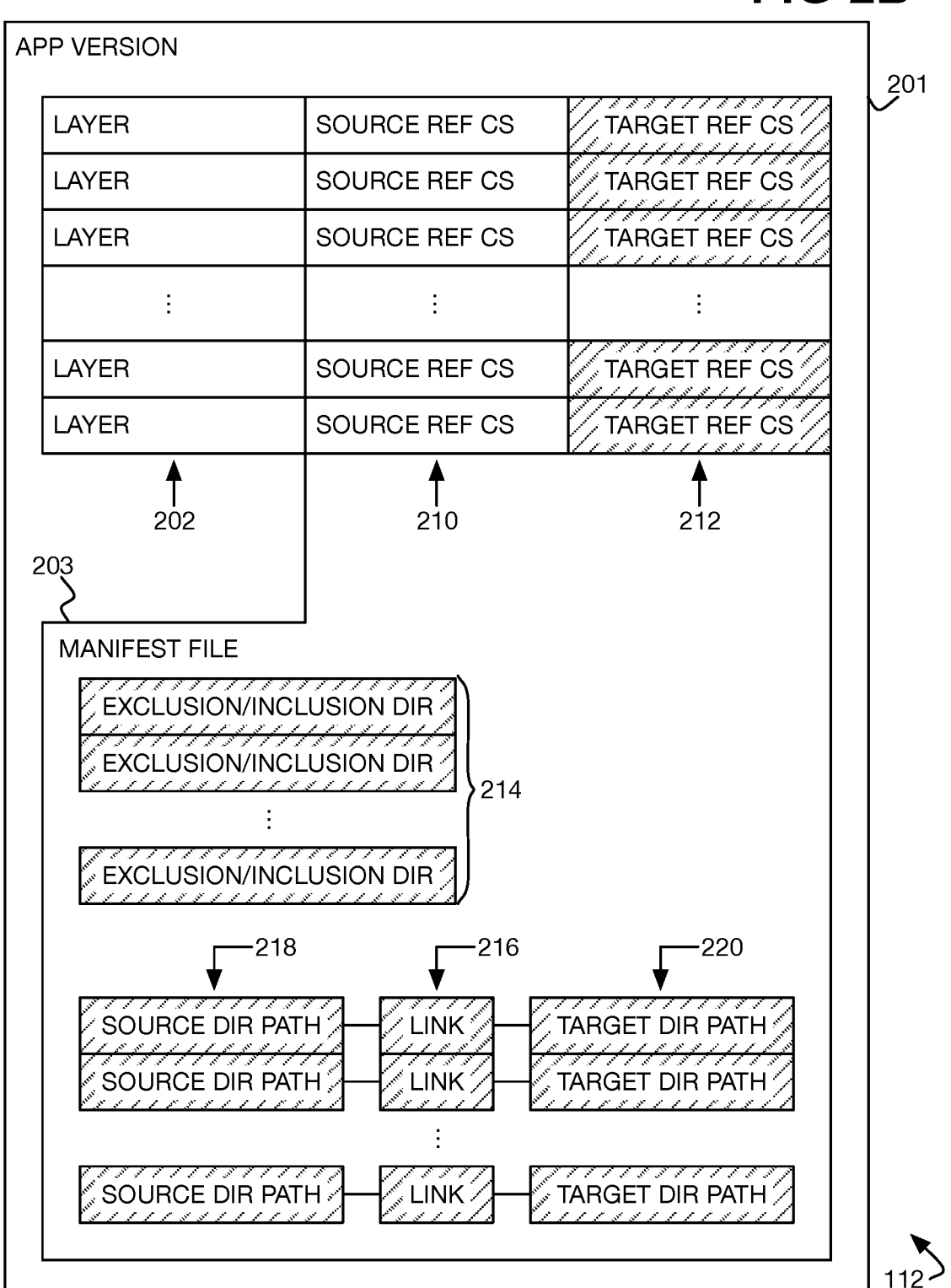

FIGS. 2A and 2B show the container image 112 for the cross-platform application 102 in detail. FIG. 2A shows that the container image 112 can include multiple versions 201 of the application 102. Each version 201 of the application 102 is immutable. That is, once a version 201 has been created, it cannot be changed. If changes are to be made to a version 201, a new version 201 of the application 102 is created within the container image 112.

FIG. 2B shows a version 201 of the cross-platform application 102 within the container image 112 in detail. The container image 112 includes multiple image layers 202 for the version 201 of the application 102. The image layers 202 are ordered starting from a first image layer 202 through a last image layer 202. The image layers 202 include the files, organized within a directory structure, needed to run the version 201 of the application 102. The files of each version 201 of the cross-platform application 102 are thus said to be packed into the container image 112.

The first image layer 202 for a version 201 of the cross-platform application 102, for instance, may correspond to operating system files needed to run that version 201 of the application 102. Other image layers 202, closest to the first image layer 202, may correspond to system files other than the operating system files and that are also needed to run the version 201 of the application 102. Examples of such system files include shell files, runtime environment files (e.g., JAVA runtime environment (JRE) files, server environment files (e.g., APACHE TOMCAT server environment files), and so on. Other image layers 202, farthest from the first image layer 202, can then include files for the version 201 of the application 102 itself.

The container image 112 includes a manifest file 203 for each version 201 of the cross-platform application 102. The manifest file 203 for a version 201 provides information indicating how the image layers 202 for the version 201 are to be unpacked by a container runtime engine running on a platform of a computing device so that the version 201 of the application 102 can be executed within a container. The manifest file 203 can include information other than that depicted in the figure. In general, the manifest file 203 includes source reference checksums 210 corresponding to the image layers 202. The source reference checksum 210 is the checksum for the files of a corresponding image layer 202 when extracted by the container runtime engine 110 on the source platform 106.

Specifically, once an image layer 202 has been unpacked, the engine 110 computes a checksum of the extracted files and compares it to the corresponding source reference checksum 210. If the computed checksum does not match the source reference checksum 210 for that image layer 202, then immutability of the version 201 of the cross-platform application 102 including the image layer 202 has been violated. Throughout execution of the version 201 of the application 102 within a container 104 on the source platform 106, the engine 110 can compute the checksum to verify that immutability is not violated.

In one implementation, if an immutability violation occurs, then the user may be notified, and execution of the application 102 may be terminated. In another implementation, any files that have been modified, added, or deleted as compared to in the container image 112—and thus resulted in the immutability violation occurring—may be restored (if modified or deleted) from the image 112 or deleted (if added). Therefore, in this implementation, immutability is maintained, and the execution of the application 102 does not have to be terminated.

The image layers 202 and their corresponding source reference checksums 210 within the manifest file 203 are depicted in non-shaded form in the figure, because they are part of the original container image 112 as created at the source platform 106, such as by the container runtime engine 110. So that the container image 112 can also be used by the container runtime engine 120 to instantiate a container 114 of the cross-platform application 102 on the target platform 116 of the computing device 118, the container image 112 is modified to include target reference checksums 212. The container image 112 may also be modified to include exclusion/inclusion directories 214, and/or links 216 between source directory paths 218 and target directory paths 220. Therefore, the target referenced checksums 212, the directories 214, and the links 216 between paths 218 and paths 220 are depicted in shaded form in the figure.

The target reference checksums 212 correspond to respective image layers 202 in a similar manner as the source reference checksums 210 do. When the container runtime engine 120 unpacks an image layer 202 onto the target platform 116 of the computing device 118, the engine 120 computes a checksum of the extracted files and compares the computed checksum to the target reference checksum 212 to maintain immutability of the version 201 of the cross-platform application 102 including the image layer 202. As with the container runtime engine 110 and the source reference checksums 212, the container runtime engine 120 can, as a version 201 of the application 102 is being executed within a container 114, periodically or at every subsequent execution compute the checksum and compare it to the target reference checksum 212 for the image layer 202 to ensure that immutability has not been violated.

The target reference checksum 212 for an image layer 202 can differ from the source reference checksum 210 for that image layer 202. This is because that not all the files within the image layer 202 for a version 201 of the application 102 may have to be extracted at the target platform 116 for containerized application execution within a container 114 on the target platform 116. As noted, the container image 112 is originally created at the source platform 106, for the cross-platform application 102 as may have been developed on the source platform 106. Therefore, the image layers 202 for a version 201 of the application 102 may include files that are particular to containerized execution of the application 102 on the source platform 106, but which are not needed on the target platform 116. As such, the target reference checksum 212 will correspondingly differ, since it is computed just from the files that have to be extracted on the target platform 116.

The exclusion/inclusion directories 214 for a version 201 of the cross-platform application 102 specifically indicate which directories of files are to be excluded or included during unpacking of the image layers 202 for the version 201 on the target platform 116. If the exclusion/inclusion directories 214 are exclusion directories, then files in the specified directories are not extracted on the target platform 116 during unpacking of the image layers 202. Files not in the specified directories are extracted on the target platform 116. By comparison, if the exclusion/inclusion directories 214 are inclusion directories, then just the files in the specified directories are extracted on the target platform 116 during unpacking of the image layers 202. Files not in the specified directories are not extracted on the target platform 116.

As noted, the containerized execution of the cross-platform application 102 on the source platform 106 can rely on commands specific to the source platform 106 for filesystem isolation purposes. Such filesystem isolation-oriented commands include change root commands ("chroot") that change the root directory to a specified source directory (i.e., a specified directory at the source platform 106) and mount point commands ("mount pointing") that create a mount point at a specified source directory in the case of the LINUX operating system. These commands are not available on other platforms, such as the MICROSOFT WINDOWS operating system.

Therefore, links 216 can be added to the manifest file 203 for a version 201 of the cross-platform application 102 to specify source directory paths 218 that are the subject of the filesystem isolation-oriented commands to target directory paths 220 at the target platform 116. Symbolic links (e.g., "shortcuts" in the MICROSOFT WINDOWS operating system) to the target directory paths 220 are created by the container runtime engine 120 during instantiation of the container 114 for the cross-platform application 102 (i.e., during unpacking of the image layers 202). During containerized execution of the version 201 of the application 102, when a filesystem isolation-oriented command referencing a source directory path 218 of a link 216 is encountered, the runtime engine 120 proceeds to change the current directory to the corresponding target directory path 220 of the link 216 as pointed to by the created symbolic link.

For instance, a source directory path 218 can be a directory path within the directory structure of the files that are extracted when extracting an image layer 202. A symbolic link to the corresponding target directory path 220 specified by a link 216 is created at the source directory path 218. Therefore, when the source directory path 218 is encountered within a filesystem isolation-oriented command during containerized execution of the version 201 of the cross-platform application 102 on the target platform 116, rather than execute the command (which cannot be done since the target platform 116 is not compatible with the command), the container runtime execution engine 120 changes the current directory to the target directory path 220 to which the symbolic link points. The file system isolation-oriented command is said to be translated in this respect, in that the current directory is changed to the target directory path 220 to which the symbolic link in the source directory path 218 points. The links 216 thus pertain to file system isolation-oriented commands.

This approach effectively mimics the behavior of the filesystem isolation-oriented commands of the LINUX operating system on the MICROSOFT WINDOWS operating system for filesystem isolation purposes during containerized execution of the cross-platform application 102 on the target platform 116. No linking or other deep integration of the container runtime engine 120 into the kernel of the operating system of the target platform 116 is required. Therefore, the runtime engine 120 can be developed by a third party that is unaffiliated with the developer of the target platform 116. In this and other respects, the runtime engine 120 is considered a lightweight container runtime engine. While resource isolation may not be provided during containerized application execution, filesystem isolation can still be insofar as the target directory paths 220 are particular to the cross-platform application 102 of the container image 112.

FIGS. 3A, 3B, and 3C show an example method 300 for containerized execution of the cross-platform application 102 of the container image 112 as modified for the target platform 116. The method 300 is performed at the target platform 116 of the computing device 118. For instance, the method 300 can be performed by the container runtime engine 120 running on the target platform 116. The method 300 can be implemented as program code stored on a non-transitory computer-readable data storage medium and executable by a processor, such as a processor of the computing device 118. The program code thus can implement or realize the container runtime engine 120 when executed.

The method 300 is performed as to a given version 201 of the cross-platform application 102, which is referred to as the version 201 of interest. The version 201 of interest of the application 102 may be the most recent version 201 of the application 102, or an older version 201. The method 300 can be performed as the version 201 of interest changes. For example, if a new version 201 of the application 102 is created after the method 300 has already been performed, then the method 300 may be performed again for the new version 201 as the version 201 of interest. As another example, if an older version 201 of the application 102 is desired to be executed after the method 300 has been performed as to a more recent version 201, then the method 300 may be performed again for the older version 201 as the version 201 of interest.

In FIG. 3A, the manifest file 203 for a version 201 of interest within the container image 112 is read (302). Links 216 from respective source directory paths 218 to respective target directory paths 220 are identified within the manifest file 203 (304). For each link, a directory structure is created at the target platform 116 for the target directory path 220 of the link 216 (306), and a symbolic link pointing to the corresponding directory structure is created and that is ultimately located within the source directory target path 218 of the link 216 (308).

The target reference checksums 212 for the image layers 202 for the version 201 of interest of the cross-platform application 102 are further identified within the manifest file 203 (310), as is a specification of the image layers 202 for the version 201 of interest of the application 102 within the container image 112 (312). The specification of the image layers 202 includes the order in which the image layers 202 are to be unpacked, starting from the first image layer 202 through a last image layer 202. A specification of the exclusion/inclusion directories 214 is also identified within the manifest file 203 for the version 201 of interest (313).

In FIG. 3B, the specified image layers 202 are unpacked (314), starting with the first image layer 202 and ending at the last image layer 202. Unpacking of the image layers 202 can be performed as follows. A root or base directory for the container image 112 itself (i.e., for the cross-platform application 102 itself) may first be created (316), if it does not already exist. For example, if the method 300 was previously performed for a different version 201 of the cross-platform application 102, then the root or base directory may already exist. A directory corresponding to the version 201 of interest of the application 102 is created within the root or base directory for the container image 112 (318). The current layer is then set to the first image layer 202 (320).

Files from the current layer are then copied (i.e., extracted) to the directory for the version 201 of interest (322). During such extraction, just the files specified in the identified exclusion/inclusion directories 214 are copied if the directories 214 are inclusion directories, or files specified in the exclusion/directories 214 are skipped and not copied if the directories 214 are exclusion directories. The copied files may overwrite files that have already copied for prior image layers 202. If the current layer is not the last image layer 202 (326), then the current layer is advanced to the next image layer 202 (328), and the method 300 proceeds back to part 320 with the new current layer. This process is repeated until all the image layers 202 for the version 201 of interest of the cross-platform application 102 are processed.

In FIG. 3C, as each image layer 202 is unpacked, a checksum for the image layer 202 is computed (330). The checksum may be computed as files of an image layer 202 are extracted, or after the image layer 202 has been completely unpacked, in which case the created directory for the image layer 202 is traversed to compute the checksum from the extracted files. The checksum may be a hash of the files extracted from the image layer 202. The checksum may be based on the entirety of each file, or just the filename and/or other metadata of the file.

The computed checksum is compared to the previously identified target reference checksum 212 for the image layer 202 (332). If the checksums are not equal (334), then the method 300 in one implementation terminates in an error (336), such that execution of the cross-platform application 102 is prevented and does not occur. If the checksums are not equal, this means that immutability of the version 201 of interest of the cross-platform application 102 has been violated. That is, the files extracted to the created directory for the version 201 differ from what is expected, such that one or more of the files have been modified or removed, or one or more other files have been added. Execution of the version 201 of interest of the application 102 is thus prevented in this implementation. However, as noted above, in another implementation the files that have been deleted or modified as compared to the image layer 202 in question may be restored from the image layer 202, and the files that have been added as compared to the image layer 202 may be deleted. As such, in this other implementation, immutability is maintained, and execution of the version 201 of interest of the application 102 is not prevented.

Assuming the checksums are equal (334), however, a symbolic link to the version 201 of interest of the cross-platform application 102 is created (338). That is, a symbolic link to the directory for the version 201 of interest is created. The symbolic link may be created in the root or base directory for the container image 112 of the application 102. If the method 300 has already been performed, then a symbolic link may have already been created in the root or base directory, in which case the existing symbolic link can be replaced with a newly created symbolic link.

The version 201 of interest of the cross-platform application 102 is then executed (340). For instance, containerized execution of the application 102 may be initiated at the symbolic link, such that the version 201 of interest of the application 102 is executed. During execution, any encountered file system isolation-oriented commands referencing source directory paths 218 of links 216 are translated to the symbolic links pointing to corresponding target directory paths 220 of the links 216 (342), as has been described.

Figure 4A:
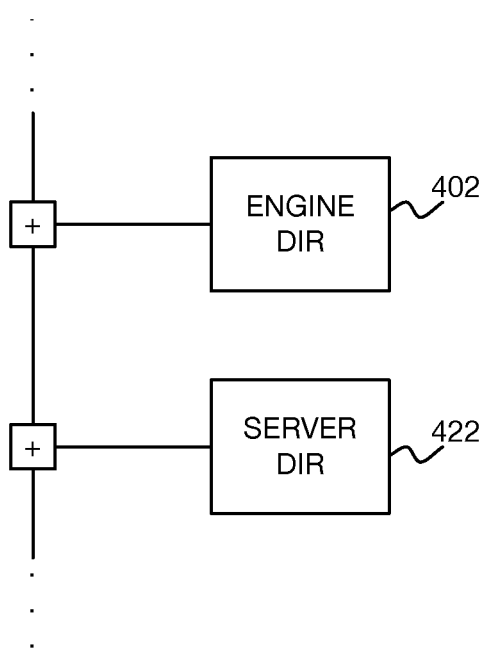
Figure 4B:
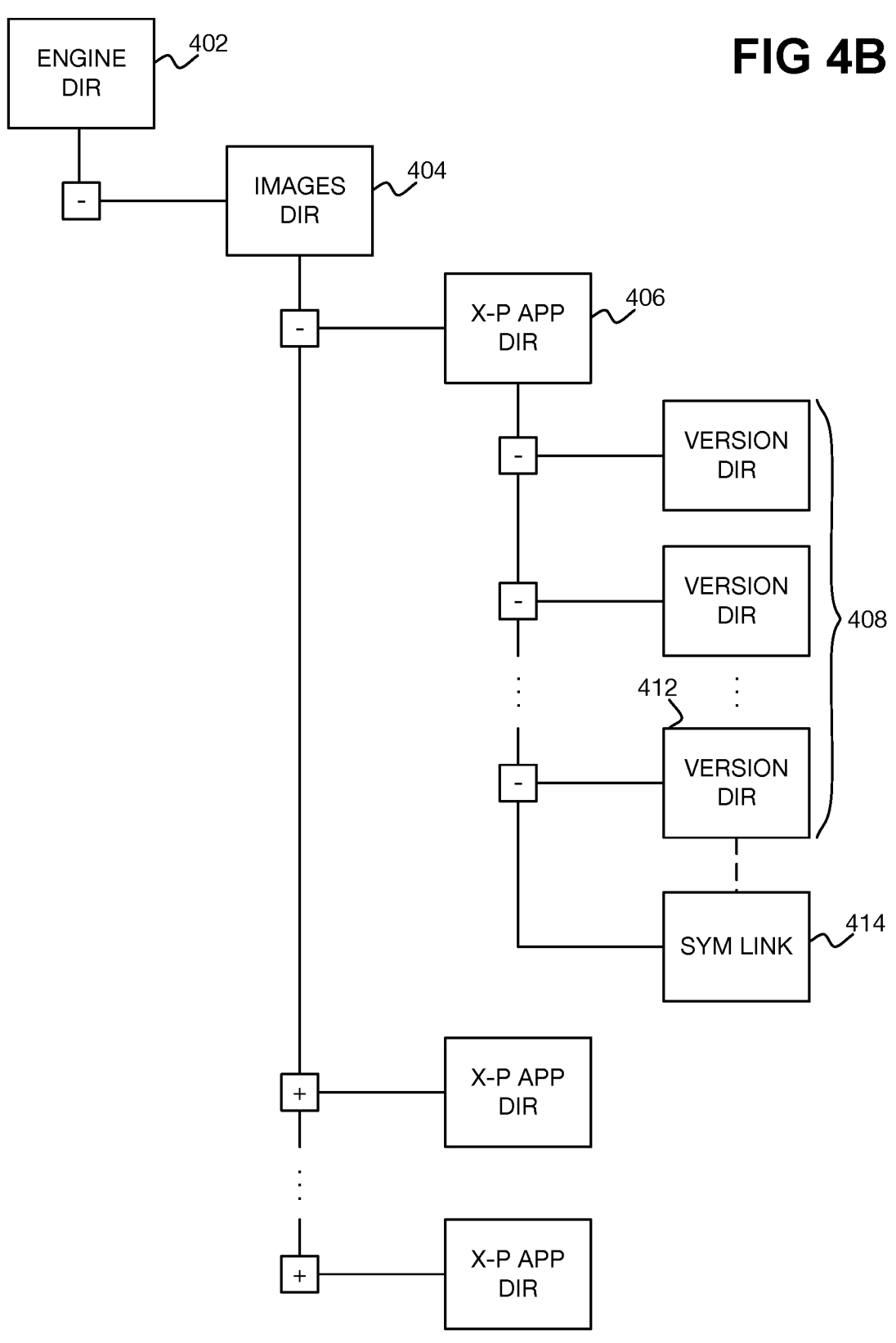

FIGS. 4A, 4B, and 4C illustratively depict example performance of the method 300. FIG. 4A shows two directories 402 and 422: an engine directory 402 and a server directory 422. The directories 402 and 422 may both be subdirectories under a parent directory, such as the root physical volume of the computing device 118 within the filesystem of the target platform 116, or a logical volume within the filesystem of the target platform 116 running on the computing device 118. The logical volume may correspond to a user directory, an administrator directory, or a root directory, for instance, within the filesystem of the target platform 116.

FIG. 4B shows an images directory 404 that is a subdirectory under the engine directory 402, in which directories corresponding to container images for cross-platform (as well as platform-independent) applications are created. Specifically called out in the figure is the cross-platform application directory 406 created for the container image 112 of the cross-platform application 102. The directory 406 is thus a subdirectory under the images directory 404, and is created per part 316 of the method 300.

Under the cross-platform application directory 406 are version directories 408 that correspond to the versions 201 of the cross-platform application 102 within the container image 112. A version directory 408 for a corresponding version 201 is created each time the method 300 is performed. The files extracted from the image layers 202 for a version 201 are copied to a directory structure specified by the image layers 202 to the version directory 408 for that version 201 during unpacking of the image layers 202 per part 322 of the method 300. Specifically called out in the figure is the version directory 412 corresponding to the version 201 of interest of the application 102. A symbolic link 414 pointing to the version directory 412 for the version 201 of interest is created within the cross-platform application directory 406 for the container image 112 of the application 102, per part 338 of the method 300.

FIG. 4C shows the version directory 412 corresponding to the version 201 of interest in detail. The version directory 412 includes directories 418 created in accordance with the directory structure specified by the image layers 202 for the version 201 of interest during unpacking per part 322 of the method 300. Files 416 extracted from these image layers 202 are thus copied within the directories 418 during unpacking. The individual files and any directories copied to the directories 418 during unpacking are not individually shown in the figure, except partially as to the directory 420A.

The directory 420A includes the directory 420B, which includes the directory 420C, which includes the directory 420D. The directory path specifying the directories 420A, 420B, 420C, and 420D may be a source directory path 218 of a link 216 within the manifest file 203. The target directory path 220 of this link 216 may specify the directories 424A, 424B, and 424C. The directory structure made up of the directories 424A, 424B, and 424C is created under the server directory 422 in part 306 of the method 300. A symbolic link 426 pointing to the directory 424C is thus created in part 308 of the method 300, and copied or moved to the source directory path 218 (i.e., to the directory 420D) during unpacking of the version 201 of interest of the application.

FIG. 5 shows an example method 500 for modifying the container image 112 for the cross-platform application 102 so that the application 102 can be executed within a container 114 on the target platform 116. The method 500 thus shows how the container image 112 as may have been originally created on or for the source platform 106 can be modified to include the target reference checksums 212, the exclusion/inclusion directories 214, and the links 216 of source directory paths 218 to target directory paths 220. Like the method 300, the method 500 may be implemented as program code stored on a non-transitory computer-readable data storage medium for execution by a processor of a computing device, such as the computing device 118 running the target platform 116. The program code may also realize or implement the container runtime engine 120, or another software component of the containerization technology solution that includes the engine 120.

The method 500 starts with the container image 112 for the cross-platform application 102 originally created on or for the source platform 106 for containerized execution of the application 102 on the source platform 106. Therefore, the container image 112 initially includes, for each of one or multiple versions 201 of the application 102, the image layers 202 and the manifest file 203 that includes at least the source reference checksums 210. For each version 201, a specification of any exclusion/inclusion directories 214 is received (502), and the specified exclusion/inclusion directories 214 added to the manifest file 203 for that version 201 (504). For instance, a developer or other user may specify the exclusion/inclusion directories 214, as to which directories of files should be excluded or included during unpacking of the image layers 202 within the container image 112.

For each version 201 of the cross-platform application 102, a specification of the image layers 202 within the manifest file 203 is identified (312), as in the method 300. For each version 201, the image layers 202 are unpacked, starting from the first image layer 202 and ending at the last image layer 202 (314), also as in the method 300. The image layers 202 are unpacked in accordance with the exclusion/inclusion directories 214 as has been described. In one implementation, unpacking of the image layers 202 includes actually copying the files extracted from the image layers 202 to the target platform 116. In another implementation, unpacking of the image layers 202 includes extracting the files from the image layers 202, but not actually copying them to the target platform 116. Rather, the files are extracted solely for checksum computation purposes.

That is, because the method 500 is performed to modify the container image 112 so that versions 201 of the cross-platform application 102 can be executed within a container 114 on the target platform 116, and not to actually execute the application 102, the extracted files do not have to be copied. As each image layer 202 of each version 201 is unpacked, a checksum is computed (330), as in the method 330. The checksum for an image layer 202 computed in the method 500 is the target reference checksum 212 for that image layer 202. Therefore, for each version 201, the computed checksums are added to the manifest file 203 for that version 201 (508) as the target reference checksums 212 for the image layers 202.

A specification of links 216 from source directory paths 218 to target directory paths 218 can also be received for each version 201 of the cross-platform application 102 (510). For instance, a developer or other user may specify the links 216, so that file system isolation-oriented commands can be properly translated during containerized execution of the cross-platform application 102 on the target platform 116. For each version 201, the links 216 are added to the manifest file 203 for that version 201 (512) as well.

The resulting modified container image 112 for the cross-platform application 102 can then be saved or distributed (514). A container 104 for the application 102 can still be instantiated at the source platform 106 from the container image 112, since the image 112 has been modified by adding information specific to the target platform 116 without removing or changing information specific to the source platform 106. The modified container image 112 can thus be used for containerized execution of versions 201 of the application 102 at both the source platform 106 and the target platform 116.

FIG. 6 shows an example method 600 for creating a new version 201 of the cross-platform application 102. The method 600 more specifically is for further modification of the container image 112 of FIGS. 2A and 2B to include an image layer 202 corresponding to a new version 201 of the application 102. The method 600 can be considered as an additional step, part, or act of the method 300 or 500. Like the methods 300 and 500, the method 600 can be implemented as program code stored on a non-transitory computer-readable data storage medium and executed by a processor of a computing device, such as the computing device 118 running the target platform 116.

The method 600 starts with the container image 112 for the cross-platform application 102 as has been modified for containerized execution of the application 102 on the target platform 116. Therefore, the container image 112 includes, for each version 201 of the application 102, the target reference checksums 212, the exclusion/inclusion directories 214, and the links 216 from source directory paths 218 to target directory paths 220 as has been described. A new directory 418 corresponding to the new version 201 of the application 102 is created at the target platform 116 (602), and files from the directory 418 corresponding to the version 201 of interest are copied to the new directory 418 (604). That is, the new directory 418 is a copy of the directory 418 corresponding to the version 201 of interest.

The new version 201 of the cross-platform application 102 is thus based on the version 201 of interest, such as the most recent version 201. However, more generally the new version 201 of the application 102 may be based on any prior version 201 as the version 201 of interest. In any case, once the new directory 418 for the new version 201 of the application 102 has been created and files from the directory 418 corresponding to the version 201 of interest copied to the new directory 418, a developer or other user can then modify the files and the directory structure of the new directory 418 (606). For instance, files may be added, removed, or modified to reflect new functionality in the new version 201 of the application 102, to resolve bugs and other issues in the version 201 of interest of the application 102, and so on.

Once the new version 201 of the cross-platform application 102 has been finalized (i.e., development of the new version has been completed), the image layers 202 and the manifest file 203 for the version 201 of interest are copied within the container image 112 as image layers 202 and a manifest file 203 for the new version 201 (607). That is, the image layers 202 and the manifest file 203 for the version 201 of interest are duplicated within the container image 112. This duplicate copy of the image layers 202 and the manifest file 203 forms the image layers 202 and the manifest file 203 for the new version 201, which are then modified to reflect changes to the new version 201 vis-à-vis the version 201 of interest as follows.

Specifically, a checksum is computed (608). The checksum is for files that are not included in any existing image layer 202 for the new version 201 within the container image 112. That is, the checksum is for the files that have been modified within the directory 418 for the new version 201, and for the files that have been added to the directory 418 that are not already present in the directory 418 for the version 201 of interest on which the new version 201 is based.

For example, such files can include a file in the directory 418 for the new version 201 that is not present in the directory 418 for the version 201 of interest. As another example, such files can include a file in the directory 418 for the new version 201 that is present in the directory 418 for the version 201 of interest, but which has been modified. The checksum is computed from these files stored in the directory 418 for the new version 201 of the application 102, and constitutes the target reference checksum 212 for a new image layer 202 to be added to the container image 112 after the last existing image layer 202 for the new version 201 (608).

The computed checksum is thus added for the new image layer 202 to the manifest file 203 for the new version 201 within the container image 112 (610), as the target reference checksum 212 for the new image layer 202. The files within the directory 418 for the new version 201 that are not included in any existing image layer 202 for the new version 201 are packed into the new image layer 202 of the container image 112 (612). As noted, these are the files within the directory 418 for the new version 201 that are not already present in the directory 418 for the version 201 of interest, or that are present in the directory 418 for the version 201 of interest but have been modified. Such files are thus compressed or otherwise packed into the new image layer 202.

The resulting modified container image 112 now contains the new version 201 of the application 102. Specifically, the container image 112 now includes image layers 202 and a manifest file 203 for the new version 201. The image layers 202 for the new version 201 are identical to the image layers 202 for the version 201 of interest on which the new version 201, except for the new image layer 202. The manifest file 203 for the new version 201 may be identical to the version 201 of interest except for the target reference checksum 212 for the new image layer 202.

Figure 7:
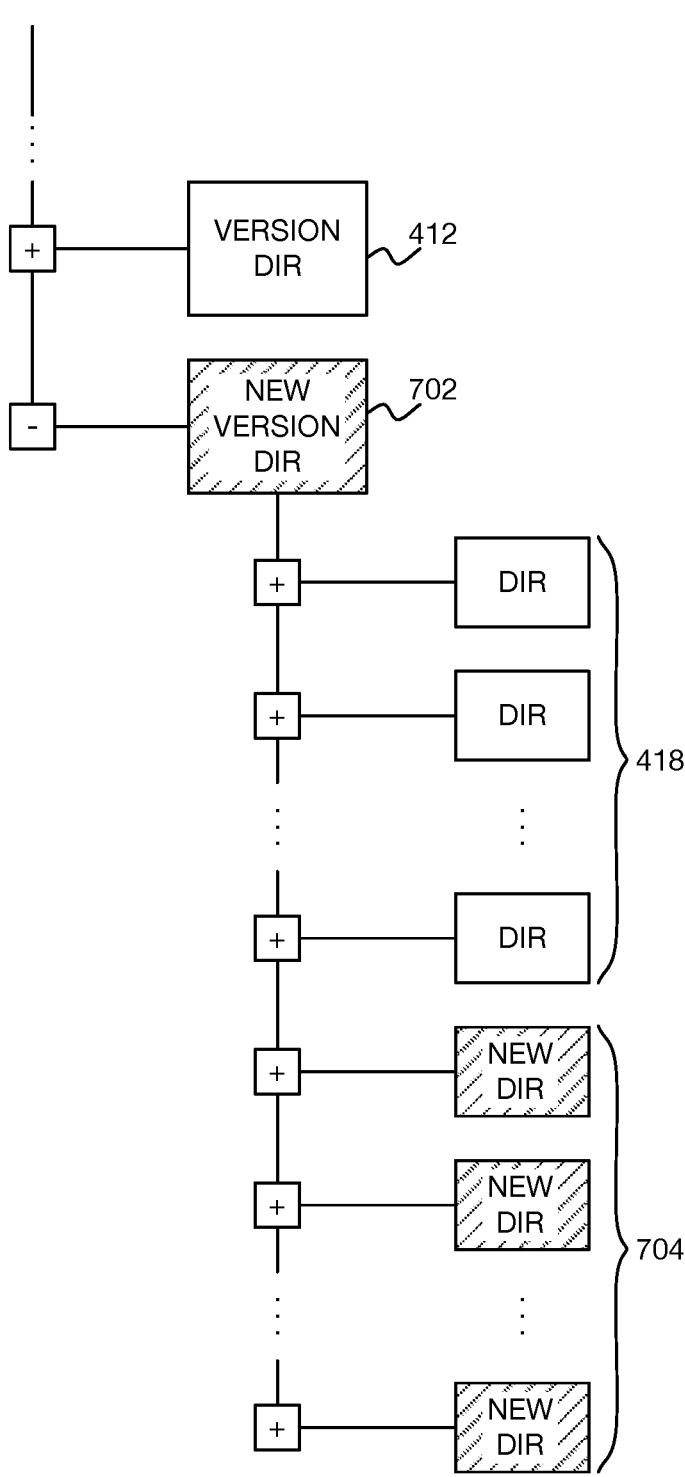
FIG. 7 is a diagram illustratively depicting example performance of the method of FIG. 6.

FIG. 7 illustratively depicts example performance of the method 600. In the depicted example, the new version 201 of the cross-platform application 102 is based on the version 201 of interest of the application 102 corresponding to the version directory 412, which is depicted in non-shaded form to indicate that the directory 412 is an already existing directory. A new version directory 702 for the new version 201 is created. The new version directory 702 is depicted in shaded form to indicate that the directory 702 did not previously exist. The existing directories 418 of files are copied from the version directory 412 to the new version directory 702. The directories 418 are depicted in non-shaded form to indicate that the directories 418 already exist.

The new version 201 of the cross-platform application 102 can then be developed based on the version 201 of interest of the application 102 corresponding to the version directory 412. Files within the directories 418 may be modified or removed from the new version directory 702, and new files may be added. The directories 418 may be selectively removed as well. As depicted in the example, new directories 704 may be added to the directory 702, which are shown in shaded form to indicate that they have been created.

Once development of the new version 201 has been finalized, the image layers 202 and the checksum 212 for the version 201 of interest are duplicated within the container image 112 for the new version 201. New or modified files within the new version directory 702 (as compared to the version directory 412) are packed into a new image layer 202 for the new version 201 within the container image 112, and a checksum is computed from these new and modified files and added to the manifest file 203 as the target reference checksum 212 for the new image layer 202 for the new version 201.

The described technique for creating a new version 201 of the cross-platform application 102 preserves immutability of the existing versions 201 of the application 102 within the container image 112. No existing version 201 of the application 102 having image layers 202 within the container image 112 is itself directly modified. That is, no image layer 202 of any existing version 201 is modified within the container image 112. This is because doing so would result in computation of a different checksum that would not match the target reference checksum 212 for a corresponding image layer 202 within a manifest file 203 for the existing version 201 in question within the container image 112. Rather, the new version 201 of the application 102 has its own image layers 202 and manifest file 203 within the container image 112.

Figure 8:
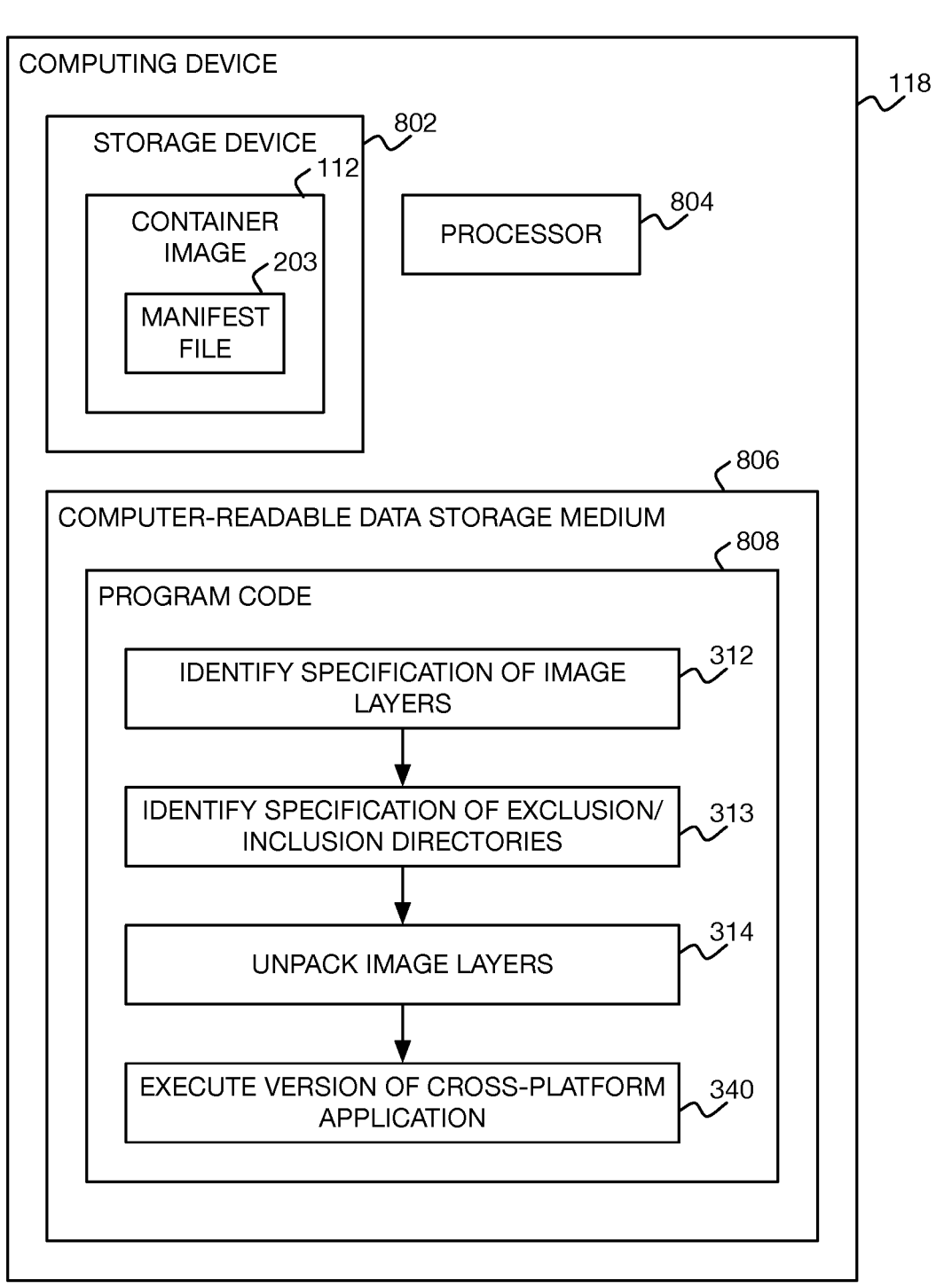
FIG. 8 is a diagram of an example computing device running a target platform and that can execute the cross-platform application of the container image of FIGS. 2A and 2B.

FIG. 8 shows the example computing device 118 that runs the target platform 116. The computing device 118 includes a storage device 802 storing a container image 112 for a cross-platform application 102 that has been containerized for execution on the source platform 106 different than the target platform 116, but which has been modified for containerized execution on the target platform 116 as well. The storage device 802 may be a hard disk drive, a solid-state drive, a volatile or non-volatile memory, or another type of computing device. The computing device 802 also includes a processor 804, and a non-transitory computer-readable data storage medium 806, which itself may be a volatile or non-volatile such medium. The computer-readable data storage medium 806 stores program code 808 executable by the processor 804 to perform processing.

The processing includes identifying, within the manifest file 203 of the container image 112, specification of image layers 202 for the cross-platform application 102 within the container image 112 (312). The image layers are ordered from the first image layer 202 through the last image layer 202. The processing includes identifying, within the manifest file 203, specification of exclusion/inclusion directories 214 related to containerized execution of the cross-platform application on the target platform 116 (313). The processing includes, starting with the first image layer 202 and ending at the last image layer 202, unpacking each image layer 202 at the target platform 116 (314), by copying files from the image layer 202 to a directory at the target platform in accordance with the identified exclusion/inclusion directories 214. The processing includes executing a version 201 of the cross-platform application 102 corresponding to the image layers 202 as unpacked at the target platform 116 (340), in a containerized manner.

Techniques have been described for containerized execution of a cross-platform application 102 at a target platform 116 different than a source platform 106 at or for which a container image 112 for the application 102 has been created. The techniques provide for modification of the container image 112 in such a way that a container runtime engine 120 running on the target platform 116 can execute the application 102 in a container 114 without the engine 120 having to deeply integrate into the kernel of the target platform 106 or otherwise. The described containerized execution of such an application 102 using a modified container image 112 nevertheless can still provide for file-system isolation.

We claim:

1. A non-transitory computer-readable data storage medium storing program code executable by a processor to perform processing comprising:

reading a manifest file from a container image for a cross-platform application associated with a first operating system that has been containerized for execution on a source platform;

identifying, within the manifest file, specification of a plurality of image layers for the cross-platform application within the container image, the image layers ordered from a first image layer through a last image layer;

identifying, within the manifest file, specification of a plurality of exclusion/inclusion directories related to containerized execution of the cross-platform application on a target platform different than the source platform;

starting with the first image layer and ending at the last image layer, unpacking each image layer at the target platform by copying files from each image layer to a directory at the target platform in accordance with the identified specification of the plurality of exclusion/inclusion directories;

executing a version of the cross-platform application associated with a second operating system corresponding to the image layers as unpacked at the target platform, in a containerized manner, wherein the first operating system is different than the second operating system;

identifying, within the manifest file, a link from a source directory path on the source platform to a target directory path on the target platform;

creating a directory structure on the target platform corresponding to the target directory path; and as the version of the cross-platform application is executed, translating a file system isolation-oriented command specific to the source platform and referring to the source directory path to a symbolic link to the created directory structure on the target platform corresponding to the target directory path as specified by the link, wherein translation of the file system isolation-oriented command to the symbolic link maintains file system isolation during containerized execution of the cross-platform application on the target platform and wherein the file system isolation-oriented command specific to the source platform and referring to the source directory comprises a change root command unavailable at the target platform, the change root command changing a root directory to the source directory on the source platform and wherein execution of the target platform is performed without native execution of the change root command.

2. The non-transitory computer-readable data storage medium of claim 1, wherein starting with the first image layer and ending at the last image layer, unpacking each image layer at the target platform comprises:

creating the directory at the target platform for the version of the cross-platform application corresponding to the plurality of image layers.

3. The non-transitory computer-readable data storage medium of claim 2, wherein the processing further comprises:

creating the symbolic link to the directory at the target platform corresponding to the version of the cross-platform application, and wherein the version of the cross-platform application corresponding to the images layer as unpacked at the target platform is executed in the containerized manner by initiating containerized execution at the symbolic link.

4. The non-transitory computer-readable data storage medium of claim 1, wherein the plurality of exclusion/inclusion directories comprise inclusion directories, and copying the files from each image layer to the directory at the target platform in accordance with the identified specification of the plurality of exclusion/inclusion directories comprises:

copying just the files from each image layer to the directory at the target platform that are within the inclusion directories.

5. The non-transitory computer-readable data storage medium of claim 1, wherein the plurality of exclusion/inclusion directories comprise exclusion directories, and copying the files from each image layer to the directory at the target platform in accordance with the identified specification of the plurality of exclusion/inclusion directories comprises:

copying the files from each image layer to the directory at the target platform except files that are within the exclusion directories.

6. The non-transitory computer-readable data storage medium of claim 1, wherein the processing further comprises:

identifying, within the manifest file, a reference checksum for each image layer specific to the target platform; and as each image layer is unpacked at the target platform, computing a checksum of the files copied from each image layer to the target platform and comparing the checksum to the reference checksum.

7. The non-transitory computer-readable data storage medium of claim 6, wherein the processing further comprises creating a new version of the cross-platform application by:

creating a new directory at the target platform corresponding to the new version of the cross-platform application;

copying files from the directory to the new directory;

after the new directory has been user-modified, computing a checksum of new and modified files within the new directory;

adding the computed checksum of the new and modified files within the new directory to a manifest file for the new version within the container image; and packing the new and modified files within the new directory into a new image layer for the new version within the container image.

8. The non-transitory computer-readable data storage medium of claim 1, wherein the file system isolation-oriented command specific to the source platform and referring to the source directory further comprises a mount point command unavailable at the target platform and creating a mount point at the source directory.

9. The non-transitory computer-readable data storage medium of claim 8, wherein execution on the target platform is performed without creating a native mount point.

10. A method, comprising:

receiving, by a processor, specification of a plurality of exclusion/inclusion directories related to containerized execution of a cross-platform application associated with a first operating system on a target platform;

adding, by the processor, the plurality of exclusion/inclusion directories to a manifest file of a container image for the cross-platform application that has been containerized for execution on a source platform different than the target platform;

identifying within the manifest file, by the processor, specification of a plurality of image layers for the cross-platform application within the container image, the image layers ordered from a first image layer through a last image layer;

starting with the first image layer and ending at the last image layer, unpacking, by the processor, each image layer at the target platform by extracting files from each image layer in accordance with the plurality of exclusion/inclusion directories;

as each image layer is unpacked at the target platform, computing, by the processor, a checksum of the files copied from the image layer to the target platform and adding the computed checksum for the image layer to the manifest file;

saving, by the processor, the container image including the manifest file to which the plurality of exclusion/inclusion directories and the computed checksum for each image layer has been added;

creating, by the processor, a new version of the cross-platform application associated with a second operating system for execution on the target platform, wherein the first operating system is different than the second operating system, receiving, by the processor, specification of a link from a source directory path on the source platform to a target path on the target platform in correspondence with which a directory structure is created on the target platform; and adding, by the processor, the link to the manifest file, wherein the link pertains to a file system isolation-oriented command specific to the source platform that is unavailable at the target platform and that is translated to a symbolic link to the created directory structure on the target platform to maintain file system isolation during containerized execution of the cross-platform application on the target platform and wherein the file system isolation-oriented command specific to the source platform and referring to the source directory comprises a change root command unavailable at the target platform, the change root command changing a root directory to the source directory on the source platform and wherein execution of the target platform is performed without native execution of the change root command.

11. The method of claim 10, wherein the plurality of exclusion/inclusion directories comprise inclusion directories, and extracting the files from the image layer in accordance with the plurality of exclusion/inclusion directories comprises:

extracting just the files from the image layer that are within the plurality of inclusion directories.

12. The method of claim 10, wherein the plurality of exclusion/inclusion directories comprise exclusion directories, and extracting the files from the image layer in accordance with the plurality of exclusion/inclusion directories comprises:

extracting the files from the image layer except the files that are within the exclusion directories.

13. The method of claim 10, wherein creating a new version of the cross-platform application further includes:

creating a new directory at the target platform corresponding to the new version of the cross-platform application;

copying the files from a directory corresponding to an existing version of the cross-platform application to the new directory;

after the new directory has been user-modified, computing a checksum of new and modified files within the new directory;

adding the computed checksum of the new and modified files within the new directory to a manifest file for the new version within the container image; and packing the new and modified files within the new directory into a new image layer for the new version within the container image.

14. The method of claim 10, wherein the file system isolation-oriented command specific to the source platform and referring to the source directory further comprises a mount point command unavailable at the target platform and creating a mount point at the source directory.

15. The method of claim 14, wherein execution on the target platform is performed without creating a native mount point.

16. A computing device running a target platform, comprising:

a storage device storing a container image for a cross-platform application that has been containerized for execution on a source platform different than the target platform;

a processor;

a non-transitory computer-readable data storage medium storing program code that the processor executes to:

identify, within a manifest file of the container image, specification of a plurality of image layers for the cross-platform application associated with a first operating system within the container image, the image layers ordered from a first image layer through a last image layer;

identify, within the manifest file, specification of a plurality of exclusion/inclusion directories related to containerized execution of the cross-platform application on a target platform different than the source platform;

starting with the first image layer and ending at the last image layer, unpack each image layer at the target platform by copying files from each image layer to a directory at the target platform in accordance with the identified specification of the plurality of exclusion/inclusion directories;

execute a version of the cross-platform application associated with a second operating system corresponding to the image layers as unpacked at the target platform, in a containerized manner, wherein the first operating system is different than the second operating system;

identify, within the manifest file, a link from a source directory path on the source platform to a target directory path on the target platform;

create a directory structure on the target platform corresponding to the target directory path; and as the version of the cross-platform application is executed, translate a file system isolation-oriented command specific to the source platform that is unavailable at the target platform and which refers to the source directory path to a symbolic link to the created directory structure on the target platform corresponding to the target directory path as specified by the link, wherein translation of the file system isolation-oriented command to the symbolic link maintains file system isolation during containerized execution of the cross-platform application on the target platform and wherein the file system isolation-oriented command specific to the source platform and referring to the source directory comprises a change root command unavailable at the target platform, the change root command changing a root directory to the source directory on the source platform and wherein execution of the target platform is performed without native execution of the change root command.

17. The computing device of claim 16, wherein the processor executes the program code to further:

identify, within the manifest file, a reference checksum for each image layer specific to the target platform; and as each image layer is unpacked at the target platform, compute a checksum of the files copied from each image layer to the target platform and comparing the checksum to the reference checksum.

18. The computing device of claim 16, wherein the plurality of exclusion/inclusion directories comprise inclusion directories, and the processor copies the files from each image layer to the directory at the target platform in accordance with the identified specification of the plurality of exclusion/inclusion directories by:

copying just the files from the image layer to the directory at the target platform that are within the inclusion directories.

19. The computing device of claim 16, wherein the plurality of exclusion/inclusion directories comprise exclusion directories, and the processor copies the files from each image layer to the directory at the target platform in accordance with the identified specification of the plurality of exclusion/inclusion directories by:

copying the files from the image layer to the directory at the target platform except files that are within the exclusion directories.

20. The computing device of claim 16, wherein the file system isolation-oriented command specific to the source platform and referring to the source directory further comprises a mount point command unavailable at the target platform and creating a mount point at the source directory.

* * * * *